United States Patent [19]

Maxwell

[11] 4,050,299
[45] Sept. 27, 1977

[54] BRAKE TESTING METHOD

[76] Inventor: Lloyd R. Maxwell, Bradford Hills, Downingtown, Pa. 19335

[21] Appl. No.: 720,642

[22] Filed: Sept. 7, 1976

Related U.S. Application Data

[63] Continuation-in-part of Ser. No. 555,813, March 6, 1975, Pat. No. 3,979,950.

[51] Int. Cl.² ............................................. G01L 5/28
[52] U.S. Cl. ...................................................... 73/126
[58] Field of Search .................. 73/123, 126, 117, 121

[56] References Cited

U.S. PATENT DOCUMENTS

| 1,987,706 | 1/1935 | Prentiss | 73/126 |
| 3,554,024 | 6/1968 | Walker | 73/121 |
| 3,872,720 | 3/1975 | Fleagle et al. | 73/121 |

*Primary Examiner*—Jerry W. Myracle
*Attorney, Agent, or Firm*—Cushman, Darby & Cushman

[57] ABSTRACT

A method and apparatus is disclosed for dynamically testing the operation of a vehicle anti-skid brake system of the kind which has first and second sensors associated with first and second vehicle wheels and which operates, when the brakes are being applied by the vehicle to release brake force to both wheels when either sensor senses imminent lock-up of its respective wheel. The method includes the steps of engaging the peripheries of both wheels with the peripheries of first and second motor-driven rolls, driving the rolls up to a high peripheral speed, applying and maintaining the vehicle brakes releasing the motor-drive to the first roll so that the first wheel tends to lock-up thereby actuating the anti-skid system, reapplying the motor drive to the first roll, releasing the motor drive to the second roll so that the second wheel tends to lock-up thereby actuating the anti-skid system, and generating signals in response to the actuation of the anti-skid system by either sensor.

3 Claims, 6 Drawing Figures

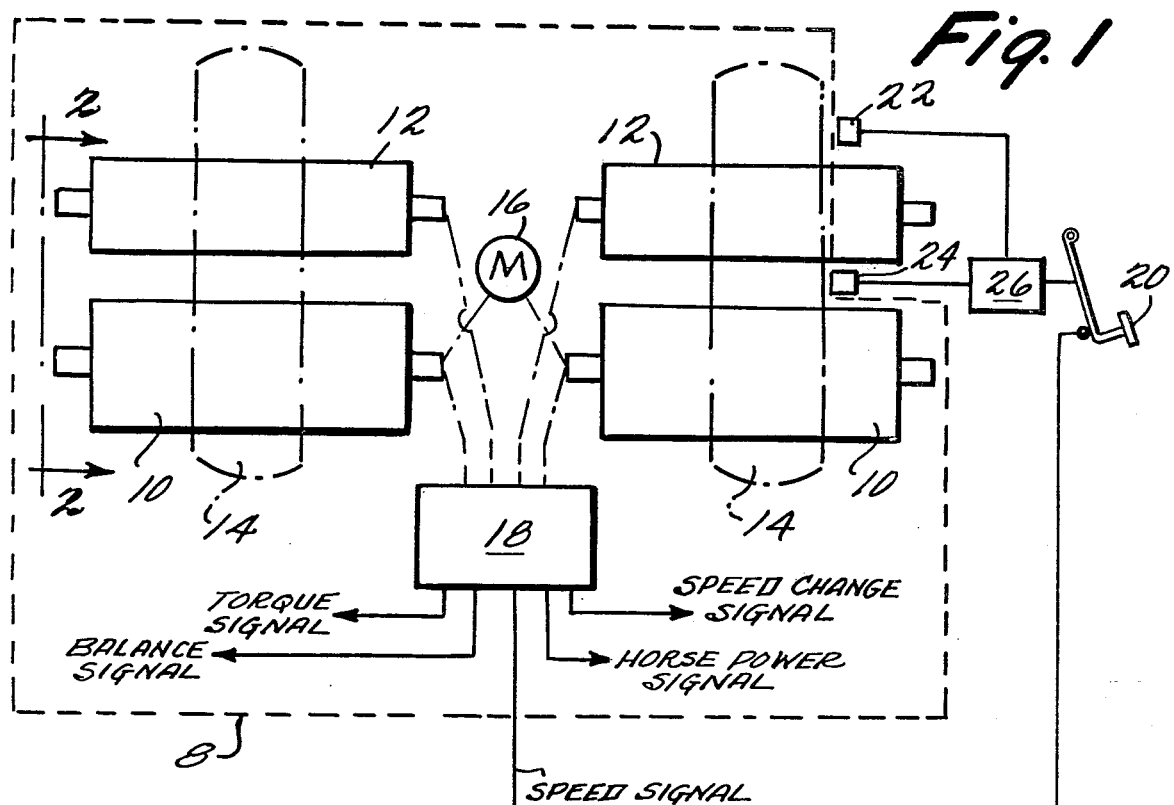
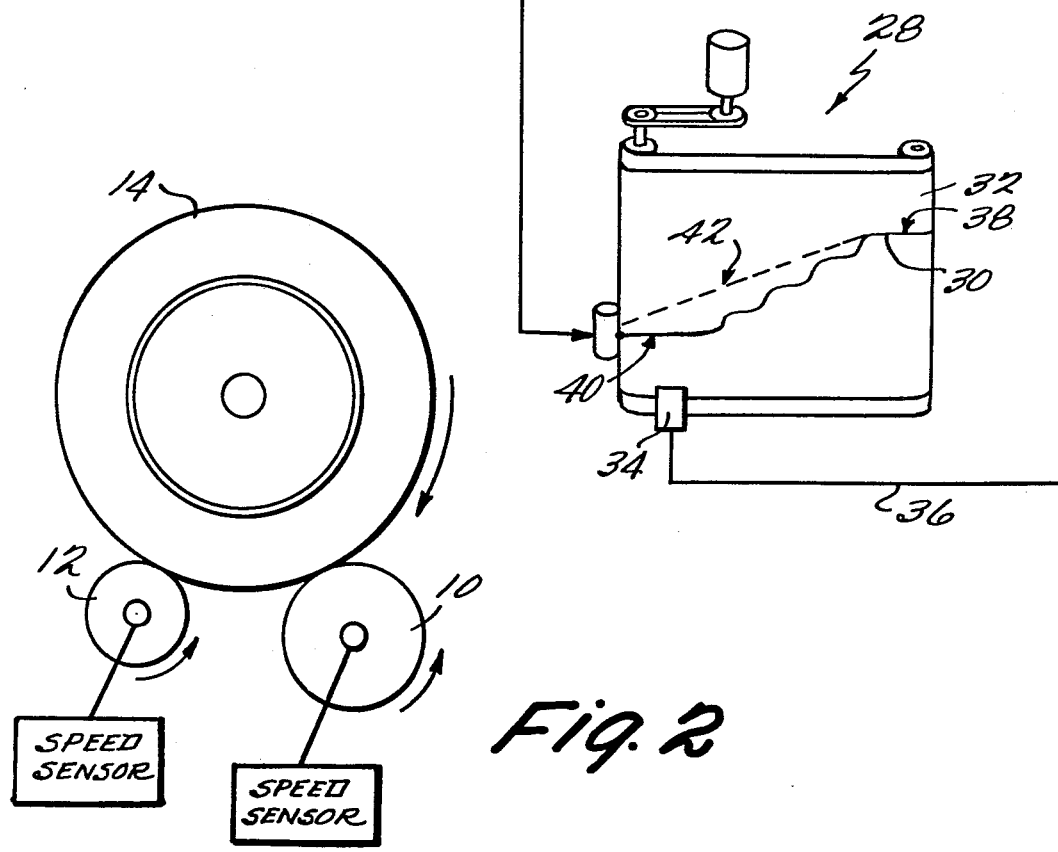

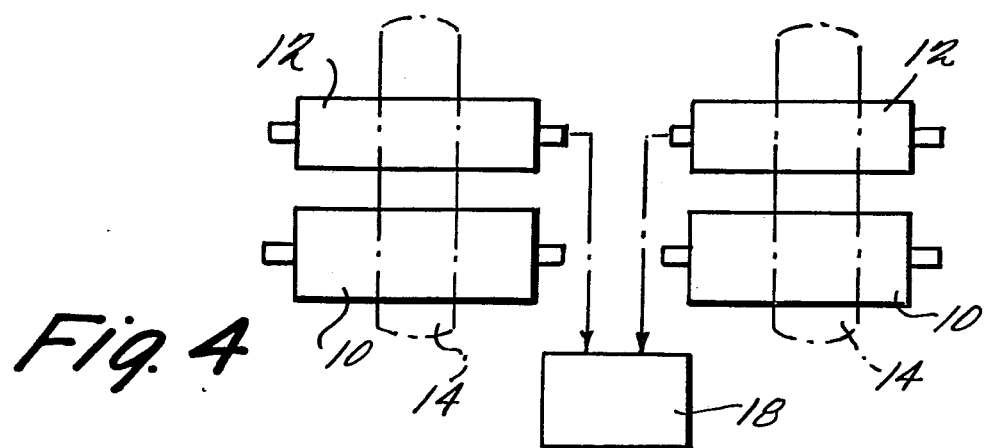
Fig. 4
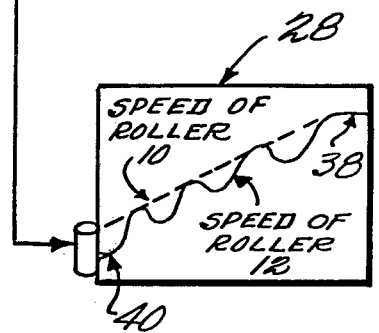
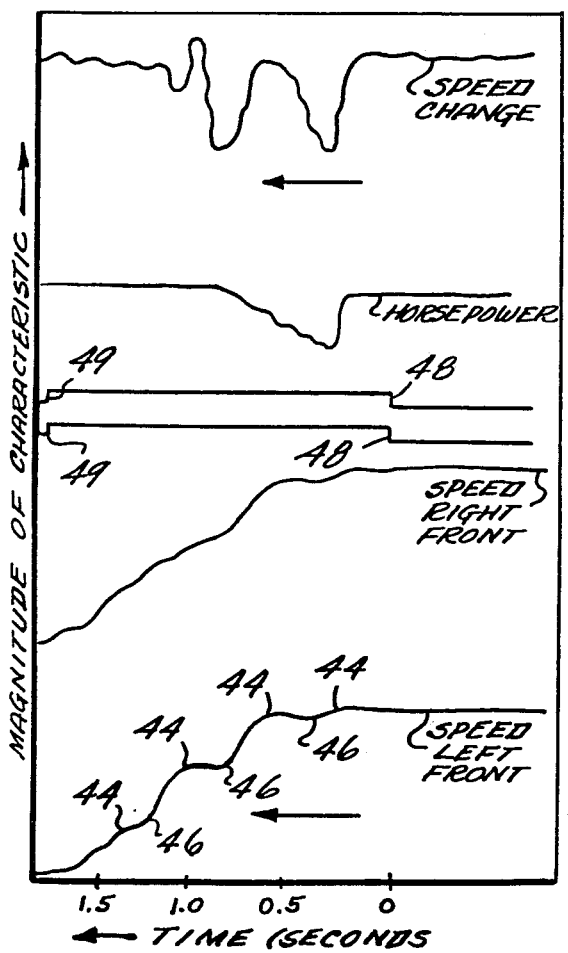
Fig. 3

BRAKE TESTING METHOD

This is a continuation-in-part of application Ser. No. 555,813 filed Mar. 6, 1975 now U.S. Pat. No. 3,979,950.

This invention relates to a system for the dynamic testing of anti-skid brake systems on motor vehicles and in particular to a method of employing a dynamometer for carrying out the test and for making a record of the test for future reference.

BACKGROUND AND GENERAL DESCRIPTION

Vehicle anti-skid brake systems, or computer brake systems or anti-wheel-lock systems as they are sometimes referred to, include a control feature which, during operation in its normal mode, prevents the brakes from locking the vehicle wheels when the driver applies high foot pressure to the brake pedal of the vehicle. This function is accomplished, broadly, by causing the braking force to release just before a locked wheel condition occurs and to rapidly reapply braking force as soon as the potential of a locked condition disappears, even though the driver's foot continues to apply high pressure to the brake pedal throughout. The cycle of release and reapplication is very rapid, perhaps 300 to 500 milliseconds, and the cycle will normally be repeated a number of times while the vehicle is being decelerated. In general these brake systems include a sensor for sensing the speed of a vehicle wheel and for generating an electrical signal at least in part from the sensed wheel speed, the signal having a predetermined characteristic which varies with the wheel speed. When the signal indicates that the deceleration of the wheel is so great that locking of the wheel is imminent, a control circuit of the system operates to reduce the force which frictionally engages the elements of the brakes. Since at this time the vehicle is moving faster than the wheel, the wheel will now begin to accelerate. Many control systems sense this condition and cause the brake system to immediately reapply braking force. If the condition is not sensed a fail-safe circuit renders the control system inoperative.

The principles on which the above-summarized operational characteristics of anti-skid brake systems are based are well understood and accepted. It has long been realized, of course, that locked wheels on a moving vehicle do not decelerate the vehicle rapidly since the sliding friction between pavement and non-rotating tires does not absorb kinetic energy at a sufficiently high rate. It is generally accepted that deceleration of a vehicle is maximum when the linear speed of the vehicle wheels is 10% to 30% less than the speed of the vehicle, that is when the slip ratio lies between 10% and 30%, slip ratio being defined as (VS-WS)/VS × 100 where VS is vehicle speed and WS is wheel speed. When a wheel is braked to the extent that its speed is more than 30% less than the vehicle speed, the sliding friction developed between tire and ground surface reduces traction to such an extent that the brakes inherently cause the wheel to lock. Therefore the broad object of any anti-skid brake system is to prevent too rapid deceleration of the wheels when the brakes are applied. In practice it is generally agreed that a wheel deceleration of more than about 1.25 g (g being the acceleration of gravity) leads rapidly to wheel lock-up and therefore many anti-skid systems employ this deceleration value in the generation of the brake-withdrawal signal.

The present invention is concerned with in-place testing of anti-skid brake systems installed in a vehicle under dynamic conditions to determine whether all sensors in a given anti-skid brake system are operative. For example, for a system which includes a sensor associated with each of two opposite rear wheels of a vehicle and a control circuit which in its normal mode of operation releases brake force to both wheels in response to either sensor's sensing of a potential lock-up of its respective wheel, the present invention provides a rapid and reliable technique for determining whether each sensor does in fact actuate the control circuit independently of the other sensor. The test in effect simulates the dynamic conditions which would be present in the event that one rear wheel of the vehicle was in contact with a patch of ice or other slick spot while the brakes were being applied. In this situation the wheel in contact with the slick spot would tend to lock up even with only a small brake force being applied. In the normal mode of operation of the brake system the sensor associated with that wheel would actuate the control circuit to release brake force to both wheels. The test contemplated by the present invention simulates this condition sequentially for each wheel and indicates in each case whether the sensor and control circuit have operated in the normal mode.

A dynamometer modified and operated according to the invention is a suitable machine for carrying out the test. By employing the testing technique of the present invention a vehicle manufacturer can readily obtain, in a matter of minutes, a permanent visual test record for each vehicle establishing that the vehicle was delivered to the dealer with an anti-skid brake system in proper working order. This is highly desirable from the manufacturer's viewpoint because it establishes that the manufacturer has complied with whatever safety standards are required by law. The visual record may therefore be of considerable significance in placing liability in the event that the allegation is made later that an accident was caused by a faulty brake system. The same advantage is available to the dealer if he continues the record of a given vehicle by testing it when it is delivered to the customer. Similarly operators of fleets of trucks and buses can continue the record by including the test in their normal periodic safety inspections.

The testing procedure of the invention described in the aforementioned U.S. Pat. No. 3,979,950 makes use of the fact that an anti-skid brake control system during operation in its normal mode causes the vehicle wheels to slow down stepwise, as discussed briefly above. These alternate decelerations and accelerations of the wheel can be sensed by a dynamometer in any of several different modes of operation, when certain special controlled conditions are pressent, and the resulting electrical signals can be either preserved in a computer memory for subsequent printout or immediately converted to some convenient visual record. The instrumentation must of course accurately measure changes in the electrical signals occurring within very short time intervals, because anti-skid controls are capable of releasing and reapplying braking forces very rapidly. The electrical signals may be representative of any of the dynamic characteristics conventionally measured by a dynamometer, such as torque, wheel speed, wheel acceleration and deceleration, horsepower of balance (brake equalization). In all cases the electrical signal utilized by the present invention will vary with a change in the speed of the vehicle wheel. Either idler roll speed alone or drive roll alone or both in combination may be sensed directly for purposes of generating a signal indicative of speed, speed change, balance or horsepower. Even if the signal does not include a direct measurement of the speed of a roll the signal will still vary with vehicle wheel speed, as for example when a simple direct torque signal is employed, due to the operation of the anti-skid brake system.

The present invention, in determining whether a control circuit designed to be operated by either of two sensors is actually operated by each sensor independently of the other sensor, needs to measure or sense only the initial release of the brakes.

DETAILED DESCRIPTION

In the drawings:

FIG. 1 is a diagrammatic view of an anti-skid brake testing system as disclosed and claimed in application Ser. No. 555,813;

FIG. 2 is a diagrammatic view taken on the line 2—2 of FIG. 1;

FIG. 3 is a portion of a strip chart illustrating the recordation of various signals produced by the testing system of FIG. 1;

FIG. 4 is a diagrammatic view of a second embodiment of a testing system of the kind disclosed and claimed in application Ser. No. 555,813;

Figure 5:
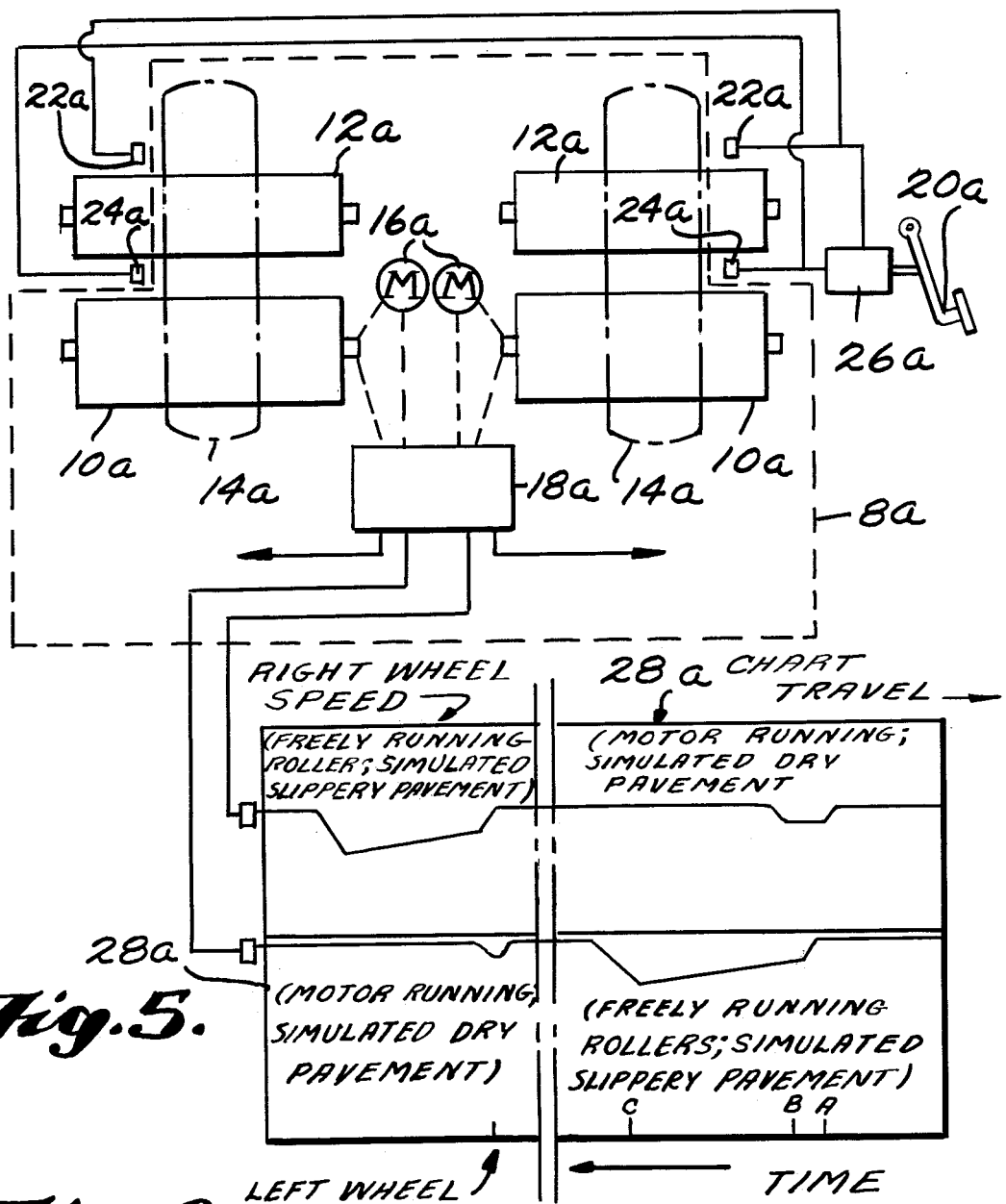
FIG. 5 is a diagrammatic view of an anti-skid brake testing system embodying the principles of the present invention.

In order to fully test an anti-skid brake system which has been installed in a vehicle it is necessary to determine whether the system operates continuously on all braked wheels over essentially the entire speed range from the speed at which the driver applies the brakes down to essentially zero speed, i.e. about 10 mph with the brakes continuously applied. This can of course be accomplished during an actual road test by fitting each vehicle wheel with a speed sensor, providing suitable sensitive instrumentation, including for example a pen recorder to record the speed of each wheel versus time and rapidly braking the vehicle on a test pad from a speed of for example 60 mph to 10 mph. During braking the pen recorder produces a graph of wheel speed versus time. If the anti-skid control system has operated satisfactorily the graph will show that the wheel has slowed down stepwise, whereas if the wheel skidded, i.e. became locked the graph will show that the wheel speed rapidly dropped to zero. The general shape of the stepwise curve is known and examples may be found in a number of patents, such as U.S. Pat. Nos. 3,467,443, 3,606,490 and 3,650,575. These patents are directed to anti-skid systems per se without regard to the testing thereof. The subject matter of these patents is incorporated herein by reference for the purpose of providing additional background information on the construction and operation of anti-skid systems.

Road testing of a vehicle to determine whether the anti-skid system is operating is of course rather time consuming in that it requires installation and removal of the test equipment for each vehicle and running the vehicle up to speed. In addition a large test area must be provided and if this is outside the road conditions will vary with weather conditions particularly in the event of rain or snow. Further close repeatability of tests is made difficult by the inability of the drivers to reach the same road speed for each vehicle, since the accuracy of dash speedometers is usually only with 5%.

Some dynamic brake testors employ dynamometer rolls for testing the brakes on a stationary vehicle. Such machines use an electric motor or motors to drive the rolls up to road speed, this in turn driving the vehicle wheels up to speed by engagement of the latter with the rolls. The motor drive is then disconnected from the rolls and the vehicle brakes are applied causing the wheels and rolls to decelerate. However, for purposes of testing anti-skid brakes this technique does not properly duplicate or simulate a road condition, because the rotating wheel has no tendency to speed up the vehicle wheel after the anti-skid system first releases the brakes. As a result the anti-skid system deactivates itself because most such systems reapply brake force only after sensing a slight wheel acceleration, as referred to earlier.

The present invention overcomes this problem by using dynamometers in a manner not heretofore known and by making special modifications to dynamometers where required. The principles of electric dynamometers are well known and therefore do not require detailed discussion. The subject matter of U.S. Pat. Nos. 3,020,753 and 3,289,471 is incorporated herein by reference.

In FIG. 1 the dynamometer portion 8 of the system includes two driven rolls 10 each having a corresponding idler roll 12. These rolls are shown in plan view in FIG. 1 and as understood the vehicle wheels 14, either front wheels or back wheels, are cradled between a driven roll 10 and its idler roll 12 as shown in elevation in FIG. 2. The rolls 10 are driven by an electric motor 16 and instrumentation system 18 is provided for receiving various informations from the rolls 10 and from the motor 16. The instrumentation system 18 generates electrical signals which are representative of the usual dynamometer characteristics such as torque, horsepower, roll speed, roll acceleration or deceleration and balance (brake equalization). The dynamometer portion 8 may be conventional and may have for example the structure and operational characteristics of any of the machines and circuits disclosed in the aforesaid U.S. Pat. Nos. 3,020,753 and 3,289,471.

A typical anti-skid brake system installed in the vehicle being tested is illustrated schematically as including a brake pedal 20, a brake-applying device 22, such as an air cylinder or hydraulic cylinder, and a wheel acceleration and deceleration sensor 24. The elements 20, 22 and 24 cooperate with an anti-skid control device 26 in a conventional manner. That is, upon application of foot pressure to the pedal 20 the device 26 operates in response to a predetermined "potential wheel-lock" signal from the sensor 24 to release brake force being applied to the wheel 14 by the element 22 and in response to a subsequent slight acceleration of the wheel 14 to cause reapplication of brake force by the element 22. The other vehicle wheel is similarly connected to the control device 26 although for simplicity of illustration this is not illustrated.

In the illustrated embodiment the speed change signal from the dynamometer instrumention system 18 is received by a strip chart pen recorder 28 which traces a line 30 on the moving graph paper 32 to form a graph of speed versus time. The recorder 28 includes an event indicator device 34 which marks the edge of the paper 32 when the brake pedal 20 is depressed and again when the pedal 20 is released. A control line 36 is provided for activating the device 34 from the brake pedal.

In operation of the FIG. 1 system the rolls 10 are driven by the motor 16 up to a typical high road speed equivalent to say 60 mph and power to the motor is maintained throughout the test. The vehicle wheels are of course now rotating at the same peripheral speed as the rolls 10. A force is now applied to the brake pedal 20 in order to apply the vehicle brakes with sufficient force, i.e. full-on, to rapidly slow down the wheels 14 at a rate sufficient to cause operation of the anti-skid control 26 provided that the latter is in operating condition. The brakes are maintained full-on until the wheels and rolls come to essentially zero speed, for example equivalent to 10 mph. Electrical power to the motor 16 is automatically cut off at this latter speed to prevent damage to the motor 16. It is critical in this mode of operating the brake test that the motor be over-run by the vehicle brakes, because the motor and rolls 10 attempt to speed up the wheels 14 each time the control 26 releases brake force. As explained before the control 26 normally will deactivate itself after the first brake release unless the sensor 24 senses a slight acceleration after each deceleration. Without the motor drive in operation the control will deactivate and the wheels will lock-up.

The graph traced by the recorder 28 in FIG. 1 shows time in the horizontal direction and speed of the rolls 10 in the vertical direction, and it can be seen that there is a stepwise reduction in the speed of the driven rolls 10 during brake application, from a constant 60 mph speed illustrated at 38 to zero speed illustrated at 40. This establishes that the anti-skid control 26 operated throughout the range 60–0 mph. That is, each time the vehicle brakes were applied by the control 26 the speed of the rolls 10 decreased rapidly, and each time the brakes were released by the control 26 the speed of the rolls 10 increased slightly due to the motor drive. If the control 26 had not operated the brakes would have locked the wheels 14 and the speed rolls would have decreased rapidly in a continuous manner somewhat as indicated by the dash line 42.

It will be understood that the speed of the rolls 10 is analogous to the speed of the wheels 14 throughout the test. The peripheral speed of wheels 14 may be less than that of the rolls 10 but each time there is a decrease in wheel speed there will be a corresponding decrease in roll speed. Similarly each time there is an increase in roll speed there will be a corresponding increase in wheel speed. Therefore, measurement of roll speed is equivalent to measurement of wheel speed for purposes of the brake test. Since idler roll speed will correspond essentially to wheel speed, the speed of the idler rolls 12 may be traced by the recorder 28 if desired. The recorder 28 is of course merely one example of a device capable making a historical record of the brake test.

FIG. 3 is a reproduction of actual strip recording charts made with the system illustrated schematically in FIGS. 1 and 2. In this case the instrumentation system 18 of the dynamometer portion 8 of the testing apparatus was connected to four pens so as to record roll speed for each of the rolls 10, horsepower being generated by the brake system and speed change of one of the rolls 10. The two speed graphs are shown in the lower portion of the figure wherein it can readily be seen that control 26 applied to the brakes at points 44 and released the brakes at points 46. The event mark 48 indicates the time of first application of a force to the brake pedal 20, and the event mark 49 indicates the removal of the force on the pedal. These marks are common to all four curves. The horsepower curve in the center of the curve shows an initial rapid increase and then a stepwise decrease. The speed change curve at the top of the figure shows alternate increases and decreases. The characteristic shape of any of these curves, or of other curves derived from the system 18, may be utilized to show whether the anti-skid control 26 has operated.

A different mode of brake testing is shown in FIG. 4. In this mode the rolls 10 are not motor driven during the test although they are initially driven up to speed by motors or by the vehicle wheels. Here, however, the rolls 10 have been modified to have high inertia relative to the inertia of the wheels 14 and this results in slippage between the rolls 10 and wheels 14 when the brakes are applied strongly. The idler rolls 12 which have relatively low inertia follow the speed of the wheels 14 and therefore in this embodiment it is necessary to sense the speed of the rolls 12 not the rolls 10. The graph of speed versus time takes the same form as in FIG. 1 when the control 26 operates properly.

FIG. 5 illustrates a testing system embodying the principles of the present invention. The system has many elements in common with the FIG. 1 system and the same reference numerals are used to designate the same parts. It will be seen that in this system there are two motors 16a, each driving one of the rolls 10a. There are also two strip charts 28a, one for the right hand roll 10a and one for the left hand roll 10a. Each vehicle wheel 14a has a sensor 24a which is electrically connected to a common brake control device 26 carried by the vehicle. The system is designed to test the operation of each of the two sensors independently of the other. With the vehicle wheels 14a cradled between the sets of rolls both motors 16a are operated simultaneously to drive the rolls 10a up to a peripheral speed of, for example, 60 mph. With the motors 16a running the vehicle brakes are applied with medium force and maintained in that mode. Under these conditions the vehicle wheels 14a tend to slow down the rolls 10a somewhat, but there is no slippage between the wheels 14a and the rolls 10a. Now, while the brakes are being applied, the motor drive to the left roll 10a is disconnected as by turning off the respective motor 16a. This simulates a slick road surface for the left vehicle speed, with the result that the latter tends to lock up due to the continued application of the brakes. If the left sensor 24a is operating properly it will sense the potential lock-up and will cause the control device 26a to release the brakes. As there is nothing to accelerate the left wheel after release of the brakes the control device 26 will not reapply the brakes. As a result the speed versus time curve for the left roll 10a will show a sharp drop in speed when the brakes are applied followed by a more gradual drop as the left roll 10a slows down naturally. If the left sensor 24a and the control device 26a have not operated, the speed versus time curve will be as shown in dotted line.

While the above is occurring with respect to the left vehicle wheel, the right vehicle wheel continues to be driven by its roll 10a. When the brakes are applied there is a drop in the speed of the right roll 10a. Since the brakes are released by the control device 26a as a result of the operation of the left sensor 24a and are not reapplied, the right vehicle wheel is speeded up as soon as the brakes are released by the control device 26. This completes one-half of the test, and the left motor 16a is then turned on again. On the right hand ends of the charts 28a initial brake application is indicated at time A, brake release by the control device 26a is indicated at time B, and reactivation of the left motor 16a is indicated at time C.

The second half of the test is carried out by disconnecting the motor drive to the right hand roll 10a while maintaining the motor drive to the left hand roll 10a. The speed versus time curve for the right roll is now recorded and will be seen to have the same shape as the curve for the left roll during the first half of the test, if the right hand sensor 24a and the control device are operating in the normal mode. The same will be true for the left roll.

While the test has been described in terms of applying the vehicle brakes before the respective motor drive is disconnected, it is possible to disconnect the motor drive and then apply the brakes.

Figure 6:
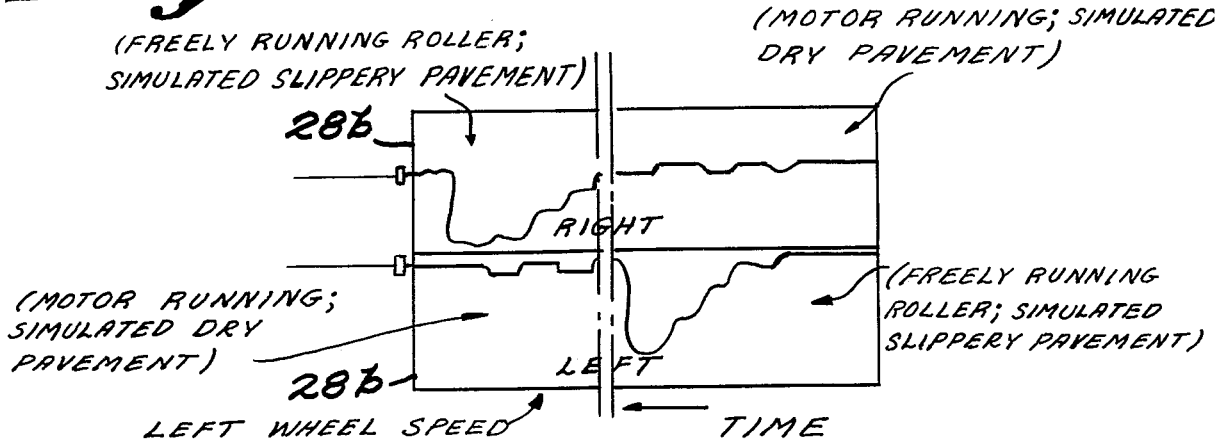
FIG. 6 is a view of strip charts illustrating the operation of a modified form of the system of FIG. 5.

If the rolls 10a, 12a have sufficient inertia relative to the vehicle wheels 14a to cause slippage between the non-driven roll 10a and the respective vehicle wheel 14a, then a step-wise speed versus time curve will be obtained for that wheel. This is analogous to the operation of the FIG. 3 system. Curves such as those shown in FIG. 6 will result.

What is claimed is:

1. A method of testing an anti-skid brake system installed in a wheeled vehicle, said brake system including a driver-actuated brake pedal and a control system having first and second sensors associated with the first and second wheels respectively for sensing a condition of the respective wheel which is indicative of imminent lock-up and a control circuit which in its normal operating mode is responsive to both sensors to release brake force to both wheels in response to the occurrence of said condition at either wheel and to rapidly reapply brake force in response to the disappearance of said condition, said method comprising: engaging the peripheries of the first and second rolls with the peripheries of first and second motor-driven rolls respectively, driving the rolls up to a high peripheral speed typical of high speed road driving thereby driving the wheels at a simulated high road speed, maintaining the motor drive to the rolls and actuating the brake system sufficient to apply the vehicle brakes and insufficient to produce said wheel condition which is indicative of imminent wheel lock-up, effecting said condition at said first wheel by releasing the motor drive to said first roll while maintaining the motor drive to said second roll, generating a signal at least in part from the sensed speed of either of the wheels, said signal having a predetermined characteristic which varies with said speed whereby said signal indicates whether said control system has been operated in its normal mode by the sensor associated with said one wheel, reapplying the motor drive to said one roll, effecting said condition at said second wheel by releasing the motor drive to said second roll while maintaining the motor drive to said first roll, and generating a system at least in part from the sensed speed of either of the wheels, said signal having a predetermined characteristic which varies with said speed whereby said signal indicates whether said control system has been operated in its normal mode by the sensor associated with said second wheel.

2. A method as in claim 1 wherein the step of generating said signals includes sensing the speed of either of said rolls.

3. A method as in claim 1 including converting said signals to a historical record representing said signals versus time during the braking step.